United States Patent [19]

Kopieczek

[11] Patent Number: 5,161,818
[45] Date of Patent: Nov. 10, 1992

[54] LATERAL COMPOUND TORSION SUSPENSION

[76] Inventor: Anthony M.J. Kopieczek, 400 Marguerite Blvd., Lafayette, La. 70503

[21] Appl. No.: 643,168

[22] Filed: Jan. 22, 1991

Related U.S. Application Data

[63] Continuation of Ser. No. 384,758, Jul. 25, 1989, abandoned.

[51] Int. Cl.⁵ .............................................. B60G 11/18
[52] U.S. Cl. ..................................... 280/723; 267/273
[58] Field of Search ............ 280/723, 721, 689, 112.1, 280/112.2; 267/273, 285, 188; 74/96

[56] References Cited

U.S. PATENT DOCUMENTS

| | | |
|---|---|---|
| 1,984,978 | 12/1934 | Moffitt . |
| 2,417,206 | 3/1947 | Larison . |
| 2,435,199 | 2/1948 | Buckendale . |
| 2,448,224 | 8/1948 | Low . |
| 2,453,116 | 11/1948 | Buckendale . |
| 2,469,566 | 5/1949 | Low . |
| 2,479,572 | 8/1949 | Hickman . |
| 2,565,756 | 8/1951 | Coleman .............................. 267/273 |
| 2,740,623 | 4/1956 | Schlegel, Jr. ........................ 267/273 |
| 2,923,556 | 2/1960 | Loehr . |
| 3,290,054 | 12/1966 | Prieditis . |
| 3,292,945 | 12/1966 | Dan Gauthier . |
| 3,315,952 | 4/1967 | Vittone . |
| 3,831,966 | 8/1974 | Grosseau . |
| 4,360,212 | 11/1982 | Scigalski .............................. 280/689 |
| 4,369,988 | 1/1983 | Takagi . |
| 4,429,900 | 2/1984 | Feber . |

FOREIGN PATENT DOCUMENTS

| | | |
|---|---|---|
| 0094295 | 11/1983 | European Pat. Off. . |
| 1165425 | 5/1962 | Fed. Rep. of Germany . |
| 1231578 | 4/1963 | Fed. Rep. of Germany . |
| 1236952 | 3/1967 | Fed. Rep. of Germany ...... 280/723 |
| 7632574 | 2/1978 | Fed. Rep. of Germany . |
| 1281427 | 12/1960 | France . |
| 1382104 | 6/1963 | France . |
| 63-176713A | 7/1988 | Japan . |

Primary Examiner—Kenneth R. Rice
Assistant Examiner—Karin Tyson
Attorney, Agent, or Firm—Dickinson, Wright, Moon, Van Dusen & Freeman

[57] ABSTRACT

A suspension system for an automobile includes a compound torsion bar arrangement. The compound arrangement has a first bar which acts as a sway bar and a second bar which provides an output torque opposite to that of an input torque. The two bars are arranged to operate together and to be attached to the same location of respective wheel support structures. Variation of the torsional characteristics of the two bars of the compound arrangement allows the roll stiffness to be varied while also varying the forces which tend to lift the inside wheel when the automobile is moving in a curved path.

18 Claims, 5 Drawing Sheets

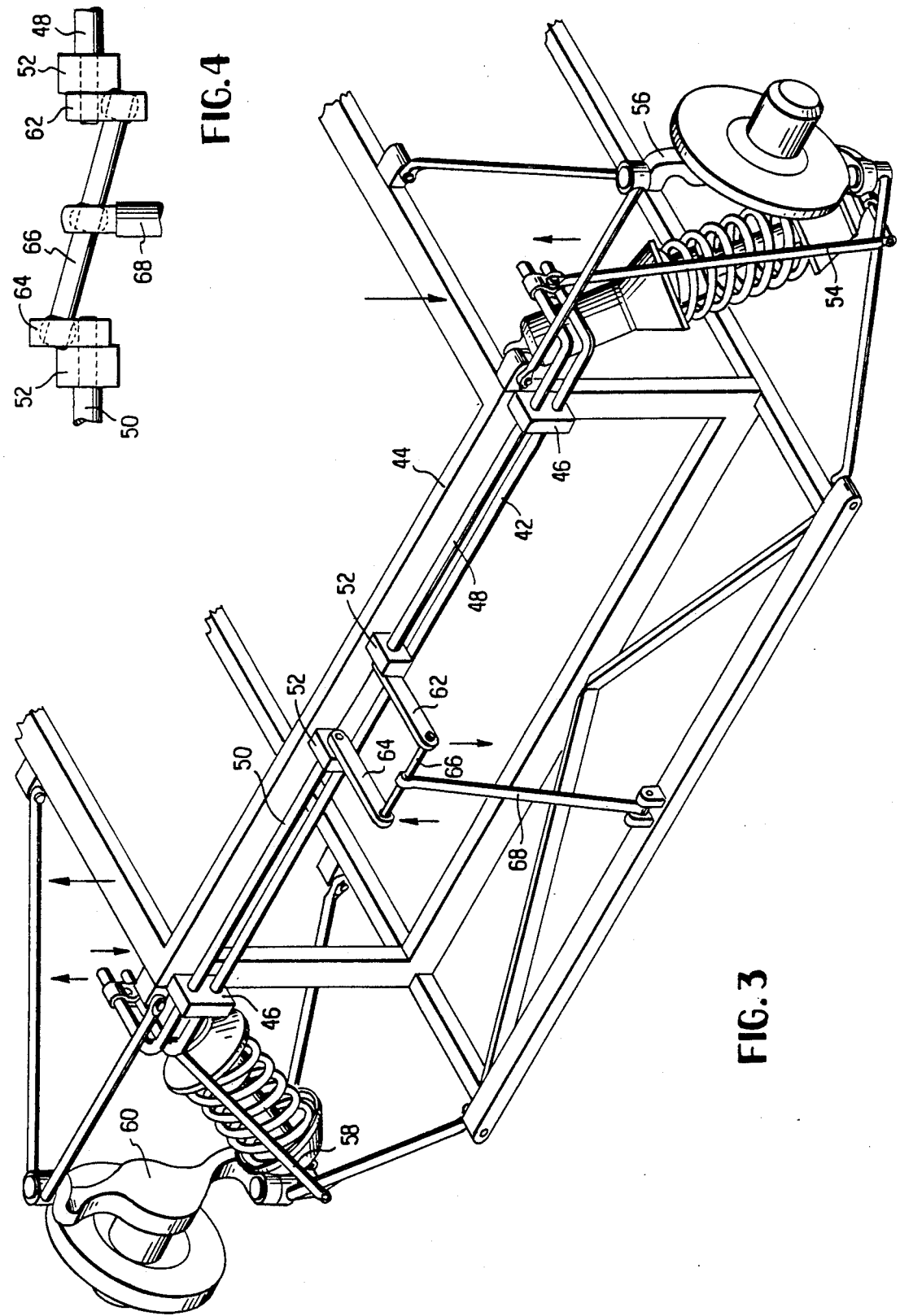

LATERAL COMPOUND TORSION SUSPENSION

This is a continuation of U.S. application Ser. No. 07/384,758, filed on Jul. 25, 1989, and now abandoned.

TECHNICAL FIELD

This invention relates to the art of automobile suspension systems.

BACKGROUND ART

In the art of automobile suspension systems, it is known to apply a resistive force to counteract and help control body motions due to lateral forces when the vehicle deviates from a straight path. Furthermore, it is known to apply these resistive forces through a medium which links the opposite wheels of one axle. For example, in a known sway bar system, the resistive force is created by the use of a U-shaped bar having opposite ends connected to respective wheels and a central portion secured to the frame of the automobile. Roll of the automobile about its roll axis produces a twist in the sway bar which resists that roll. While a sway bar is used primarily to resist roll of the automobile, it can also be used to help the location of suspension components, as an auxiliary function. It is recognized in the field of suspension design that compromises have to be made regarding the stiffness of the U-shaped bar because a bar that is stiff enough to resist roll during hard cornering unloads the inside wheel and sacrifices suspension independence.

It is also known to provide a bar in the shape of a "Z" for controlling the motion of wheels of an automobile. In this arrangement, such as that shown in U.S. Pat. No. 3,315,952 (Vittone), a forwardly directed end of a "Z" bar is attached to one wheel, a rearward-directed end of the bar is attached to an opposed wheel, and the central section is attached to the frame of the automobile. In this arrangement, an upward force on the bar applied by one of the wheels causes a downward force on the opposite wheel. Thus, a bar of this shape tends to keep an inside wheel on the ground as an automobile body rolls when moving in a curve without providing the resistance to roll motions as in the U-shaped sway bar described above.

The actions of the traditional U-shaped sway bar and the Z-shaped bar are thus contradictory and these bars have not been used in conjunction.

SUMMARY OF THE INVENTION

In accordance with the invention, a suspension system is provided which combines the actions of the U-shaped sway bar and the Z-shaped bar to produce a unique suspension system capable of providing pre-selected forces for given amounts of roll of the automobile to reduce the roll and the attendant unloading of the inside wheel common to conventional suspension systems.

In a preferred embodiment, the invention comprises two coaxial shafts which are secured together at their ends. Each of the ends is attached to a respective wheel of the same automobile axle. One of the shafts comprises two halves interconnected by a differential-like mechanism which produces a torque on a first of the halves in one direction in response to a torque on the second of the halves in an opposite direction. The other of the shafts is continuous and extends through the mechanism which interconnects the two halves of the first shaft. Thus, the resulting force at one end of the shafts is a function of the force applied at the opposite ends of the shafts and the relationship between torsional responses of the first shaft and the second shaft.

In another embodiment, the mechanism placed at the mid point of the first shaft comprises two arms which extend parallel to the longitudinal axis of the automobile and are connected by a bar. The midpoint of the bar is connected to the frame by a ball and socket connection such that twisting of a first portion of the bar in one direction causes a twist in the second portion of the bar in an opposite direction. A second, U-shaped shaft is mounted adjacent the first set of shafts, and the ends of the second shaft are connected to the suspension system mounting the wheels.

The torsional characteristics of the bars are designed such that the forces applied to the bars to prevent sway and to apply downward forces to the wheels achieve an optimum balance between these goals.

It is an object of this invention to provide a unique suspension system capable of applying competing forces in pre-selected amounts as a function of the roll of an automobile.

BRIEF DESCRIPTION OF THE DRAWINGS

FIG. 3 is a perspective view of a second embodiment of a compound torsion system in accordance with the invention.

FIG. 4 is a front view of a part of the system shown in FIG. 3.

DETAILED DESCRIPTION OF THE PREFERRED EMBODIMENTS

Figure 1:
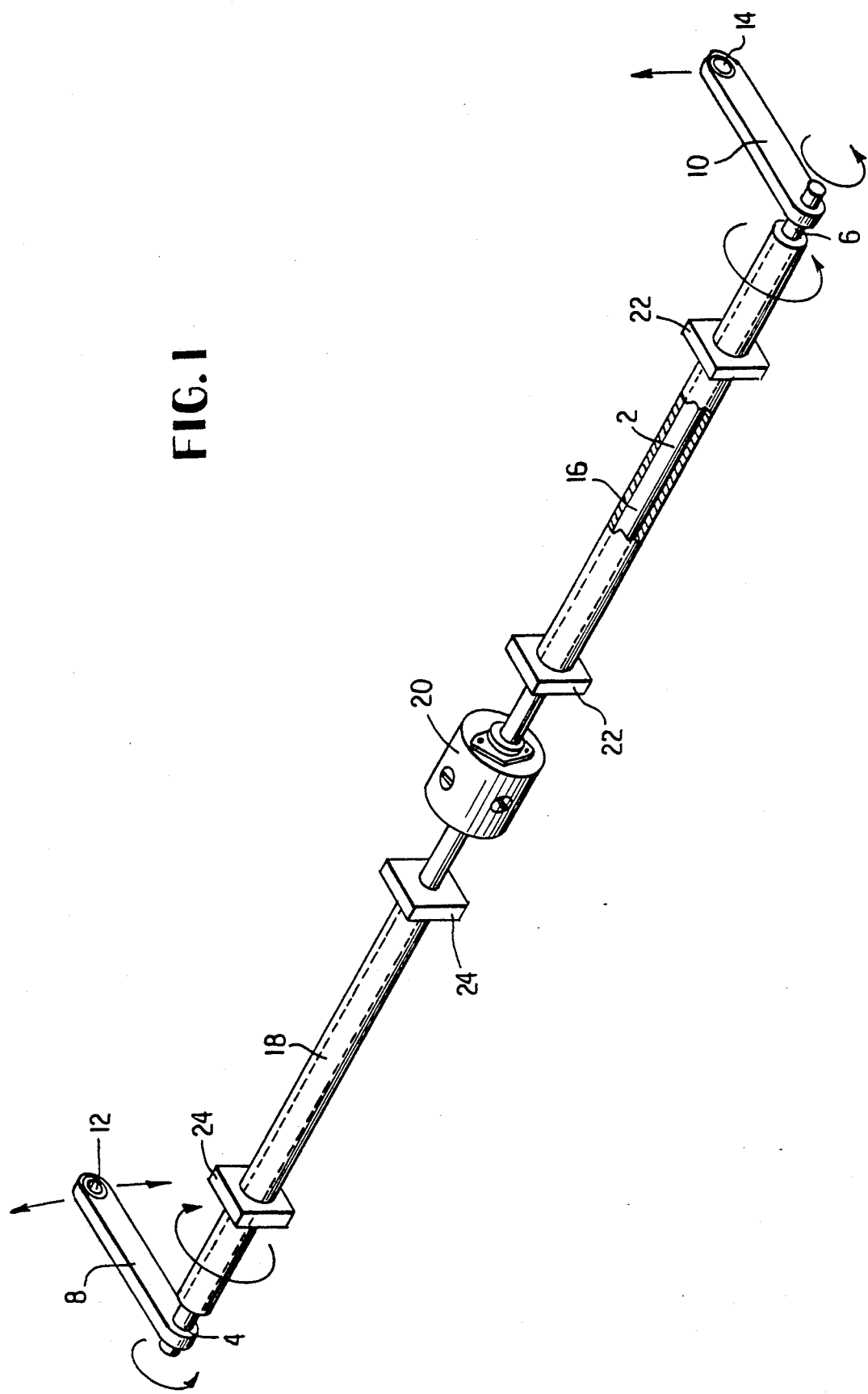
FIG. 1 is a perspective view of a first embodiment of a compound torsion system in accordance with the invention.

With reference to FIG. 1, a compound torsion system in accordance with the invention comprises a first torsion bar 2 having opposite ends 4 and 6. A first connector 8 is attached to end 4, and a second connector 10 is attached to end 6. As shown, the preferred attachment means is to provide ends 4 and 6 with splines which cooperate with splines on the connectors 8 and 10.

Socket 12 of connector 8 and socket 14 of connector 10 are adapted to receive links, which will be described in more detail with respect to FIG. 3, for attaching the connectors to respective wheel suspension structures.

A second, outer, bar comprises a first part 16 and a second part 18. The first part 16 of the outer bar is connected to end 6 of the first bar 2 and to a device 20 which produces an output torque opposite to that of an input torque applied by the first part 16. First part 16 may also be supported by pillow blocks 22. Second part 18 is connected to end 4 of the first bar and to the device 20. Second pillow blocks 24 may be used to support the second part. The first and second parts of the second bar are preferably connected to the ends 4 and 6 of the first bar by providing splines which match with the splines on the first bar 2.

By this arrangement, a torque applied to one of the connectors, such as connector 10, as a result of relative movement between the wheel of an automobile and the frame mounting the compound system shown in FIG. 1 results in a torque being applied to the other of the connectors. In some vehicles, the frame (or "chassis") is separate from the body, whereas in other vehicles the frame and body are combined into a "unibody." The term "frame" as used in this application means that part of an automobile which supports the suspension system and is intended to encompass these various constructions. The torque which results from the torque applied by the one of the connectors is a function of the torsional characteristics of the inner and outer bars. This is illustrated by the outer pair of arrows which show rotation of both ends of the inner rod in the same direction. The inner bar acts like a sway bar such that an input torque in one direction results in an output torque in the same direction. The outer bar, however acts to provide an output torque opposite to that of the input torque. This is illustrated by the inner pair of arrows. If the bars have equal characteristics, the output torque provided by the outer bar will cancel the output torque of the inner bar. The resulting output torque can, however, be adjusted to provide a predetermined output torque as a function of an input torque by providing the bars with different characteristics. The opposing forces on connector 8 are illustrated by oppositely directed arrows.

The outer bar operates like a "Z" bar in that it does not contribute to roll stiffness but does provide a force which tends to keep an inside wheel in contact with the ground as an automobile is moving in a curved path. The inner bar does provide roll stiffness but tends to lift the inside wheel from the ground as the automobile moves in a curved path. Thus, if the characteristics of the outer bar are such that the output torque is larger than that provided by the inner bar, the inner bar can be designed to provide a significant amount of roll stiffness while the torque provided by the outer bar will maintain contact between the ground and the inside wheel. The outer bar thus corrects for a significant deficiency in the action of the inner bar and allow greater design flexibility in the roll stiffness of the inner bar.

For example, a 400 pound force applied to socket 14, will be transmitted through the inner and outer bars to socket 12. If the bars have equal torsional characteristics, the output torque will be zero, and the result will be that the spring resistance of the wheel connected to socket 14 will have been increased. If the torsional characteristics are different, however, the same 400 pound input at socket 14 may result in a downward force tending to maintain the associated wheel in contact with the ground.

Figure 2:
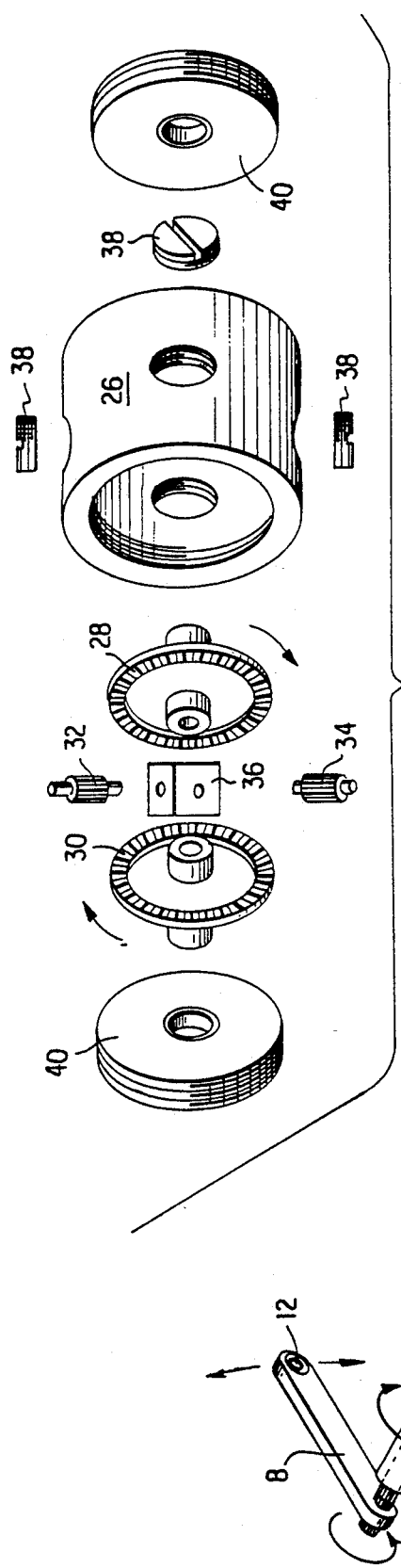
FIG. 2 is an exploded diagram of a mechanism used in the system shown in FIG. 1.

FIG. 2 shows an alternate form of the device 20 in detail. A housing 26 provides a hollow chamber for receiving a first gear 28, a second gear 30, a first connecting gear 32, a second connecting gear 34 and a bearing support block 36. Bearing plugs 38 are removably secured to housing 26 for receiving ends of the connecting gears 32 and 34. While only two connecting gears are shown, four such gears may be used. End bearing plugs 40 support gears 28 and 30.

The inner end of first part 16 is attached to gear 28, and the inner end of second part 18 is attached to second gear 30. Gears 28 and 30 are supported between a respective one of the end plugs 40 and block 36 such that connecting gears 32 and 34 are held in engagement between the gears 28 and 30. Connecting gears 32 and 34 are supported between the block 36 and a respective one of the bearing plugs 38. Thus, an input torque applied by one of the parts 16 or 18 of the outer bar results, through the action of the gears 28 and 30 and the connecting gears 32 and 34, in an equal but opposite torque being applied to the other of the parts 16 or 18. Housing 26 is attached to the frame of the automobile such that it remains stationary.

First bar 2 passes unobstructed through the center of the plugs 40, gears 28 and 30, and block 36.

Referring now to FIG. 3, a second embodiment of the compound system comprises a lower bar 42 which is mounted on a frame 44 of an automobile by bearings 46. An upper bar comprises a first part 48 and a second part 50. These parts are supported by bearings 46 and also by bearings 52. A link 54 connects ends of bars 42 and 48 to a wheel support 56, and a link 58 connects an opposite end of bar 42 and an end of bar 50 to a wheel support 60. A firs ar 62 is connected to bar 48, and a second arm 64 is connected to bar 50. The arms 62 and 64 preferably extend parallel to each other when the bars 48 and 50 are not subjected to a torque. A rod 66 connects remote ends of the arms 62 and 64, and a pivoting support 68 extends from a location on frame 44 to a midpoint of the rod 66. Support 68 provides a pivot point for the center of rod 66.

As shown in FIG. 4, the connections between the rod 66 and the arms 62 and 64 and the pivot support 68 comprise a ball and socket. When one of the bars 48 or 50 is twisted in one direction, the other bar will be twisted in the other direction by the operation of the rod 66 which pivots about the upper end of the pivot support 68. Other parts of a known suspension system are shown in FIG. 3 and need not be described further here. It will be appreciated that the compound system shown in FIGS. 3 and 4 operates in the manner described with respect to the embodiment shown in FIGS. 1 and 2.

Figure 5:
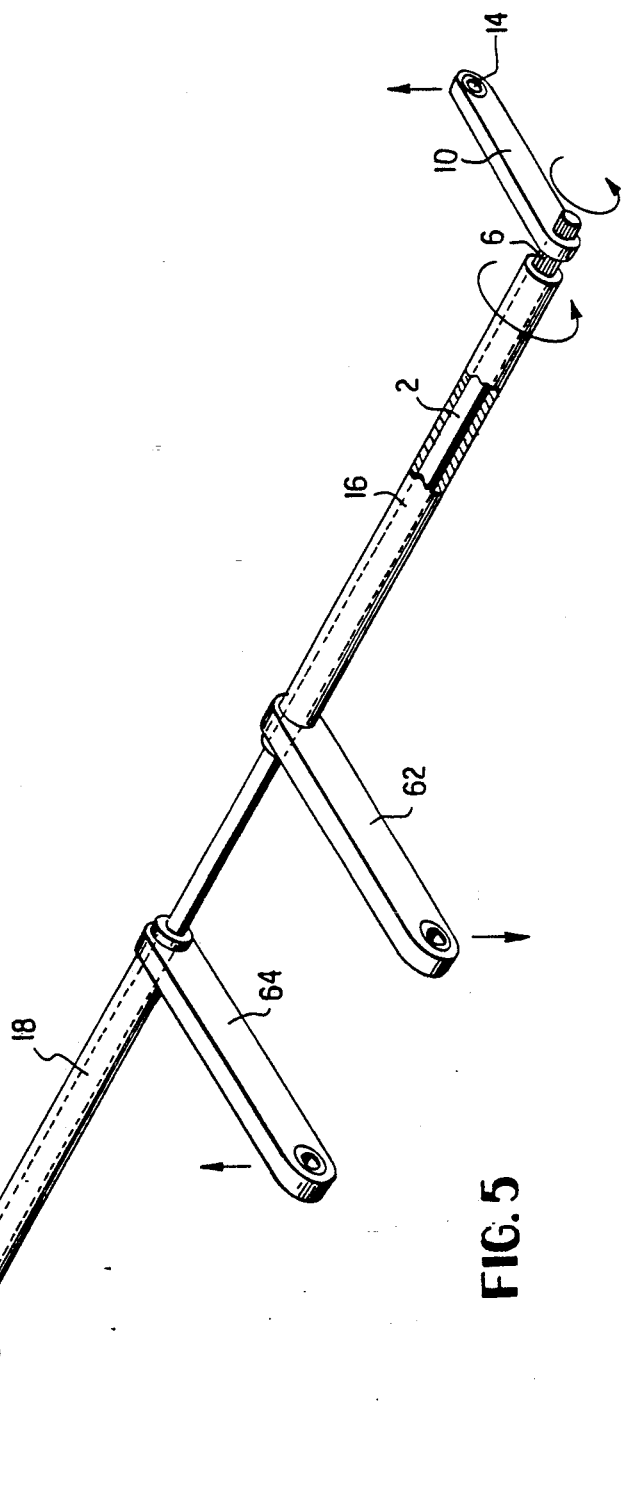
FIG. 5 is a perspective of a third embodiment of a compound torsion system in accordance with the invention.

FIG. 5 shows yet another embodiment for a compound system in accordance with the invention. This embodiment is a combination of those shown in FIGS. 1 and 3, and the parts which correspond to each of these embodiments have been identified by the same reference numerals. Arms 62 and 64 will be connected as shown in FIG. 3, whereas the torsion bars are arranged as shown in figure 1. Mounting hardware may include the pillow blocks 22 and 24 as shown in FIG. 1.

Figure 6:
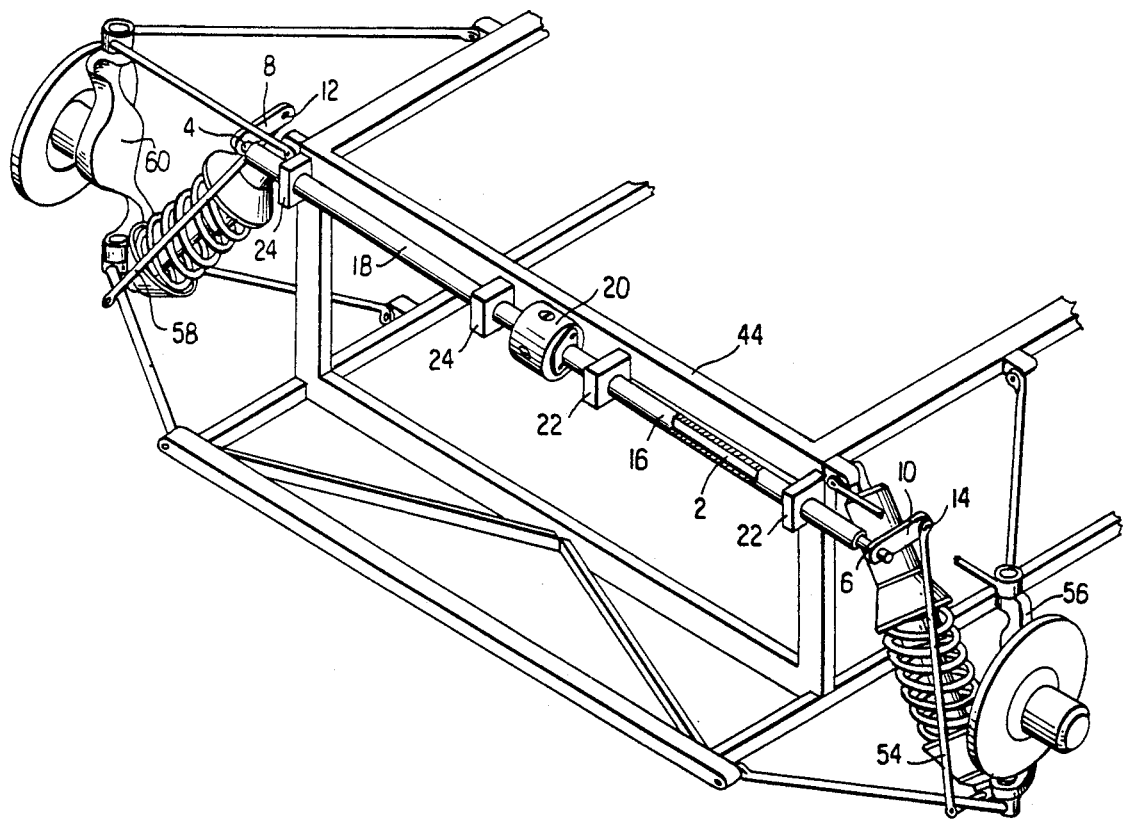
FIG. 6 shows the embodiment of FIG. 1 in combination with a frame.
Figure 7:
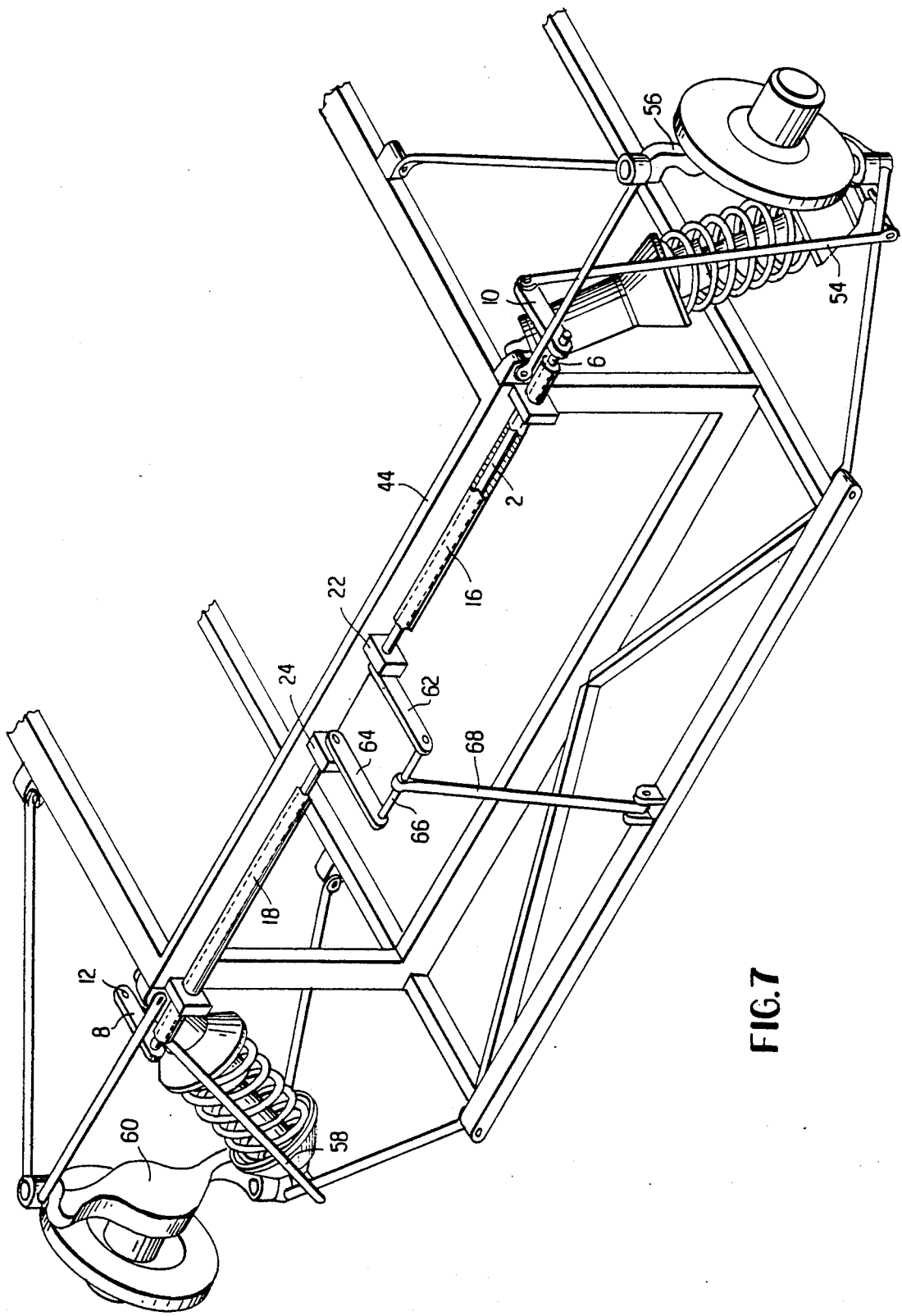
FIG. 7 shows the embodiment of FIG. 5 in combination with a frame.

FIGS. 6 and 7 shows the embodiments of 1 and 5 in combination with a frame. Reference numerals which identify parts described above have been used.

It will be appreciated that a unique compound system has been disclosed which provides increased flexibility in the design of suspension systems. Modifications within the scope of the appended claims will be apparent to those of skill in the art.

I claim:

1. A suspension system comprising a frame, first wheel support means for supporting a wheel for vertical motion with respect to said frame, second wheel support means for supporting a second wheel for vertical motion with respect to said frame, and compound torsion means for controlling the relative movements among said frame and said first and second wheel support means, wherein said compound torsion means comprises first torsion means having opposed ends attached to respective ones of said first and second wheel support means such that movement of one of said wheel support means in a first direction with respect to said frame means causes a force to be applied to the other of said wheel support means in said first direction and second torsion means having opposed ends attached to respective ones of said first and second wheel support means such that movement of one of said wheel support means with respect to said frame means in said first direction causes a force to be applied to the other of said wheel support means in a direction opposite to said first direction wherein said first torsion means comprises a first bar and said second torsion means comprises a second bar coaxial with said first bar.

2. A suspension system according to claim 1 wherein said first bar is secured to said frame for rotation with respect to said frame and further comprising a first connector attached to one end of said first bar and to said first wheel support means and extending in a second direction and a second connector attached to an opposed end of said first bar and to said second wheel support means and extending in said second direction.

3. A suspension system according to claim 2 wherein said second bar is secured to said frame for rotation with respect to said frame and said second bar comprises first and second parts connected to each other by reversing means for causing said first part to rotate in a direction opposite to a direction of rotation of said second part.

4. A suspension system according to claim 3 wherein said reversing means comprises first gear means connected to said first part, second gear means connected to said second part, and intermediate gear means interconnecting said first and second gear means for causing said first and second gear means to rotate in opposite directions.

5. A suspension system according to claim 4 wherein said first bar extends through said reversing means.

6. A suspension system according to claim 5 wherein respective opposed ends of said first bar are secured to respective opposed ends of said second bar.

7. A suspension system according to claim 3 wherein said reversing means comprises a first arm attached to said first part, a second arm attached to said second part, a rod connecting ends of said first and second arms remote from said second bar, and pivot support means intermediate said first and second arms for providing a pivot for an intermediate part of said rod.

8. A compound torsion system for an automobile comprising a first torsion means having opposed ends adapted to be attached to respective ones of first and second wheel support means such that movement of one of said wheel support means in a first direction with respect to a frame means causes a force to be applied to the other of said wheel support means in said first direction and second torsion means having opposed ends adapted to be attached to respective ones of said first and second wheel support means such that movement of one of said wheel support means with respect to said frame means in said first direction causes a force to be applied to the other of said wheel support means in a direction opposite to said first direction wherein said first torsion means comprises a first bar and said second torsion means comprises a second bar coaxial with said first bar.

9. A compound torsion system according to claim 8 wherein said second bar comprises first and second parts and further comprising reversing means for connection to said first and second parts for causing said first part to rotate in a direction opposite to a direction of rotation of said second part.

10. A compound torsion system according to claim 8 wherein respective opposed ends of said first bar are secured to respective opposed ends of said second bar.

11. A compound torsion system according to claim 9 wherein said reversing means comprises a first arm attached to said first part, a second arm attached to said second part, a rod connecting ends of said first and second arms remote from said second bar, and pivot support means intermediate said first and second arms for providing a pivot for an intermediate part of said rod.

12. A compound torsion system according to claim 9 wherein said reversing means comprises first gear means connected to said first part, second gear means connected to said second part, and intermediate gear means interconnecting said first and second gear means for causing said first and second gear means to rotate in opposite directions.

13. A compound torsion system according to claim 12 wherein said first bar extends through said reversing means.

14. A compound torsion system according to claim 8 further comprising a first connector attached to one end of said first bar for connection to said first wheel support means and extending in a second direction and a second connector attached to an opposed end of said first bar for connection to said second wheel support means and extending in said second direction.

15. A suspension system comprising a frame, first wheel support means for supporting a wheel for vertical motion with respect to said frame, second wheel support means for supporting a second wheel for vertical motion with respect to said frame, and compound torsion means for controlling the relative movements among said frame and said first and second wheel support means, wherein said compound torsion means comprises a first bar having opposed ends attached to respective ones of said first and second wheel support means such that movement of one of said wheel support means in a first direction with respect to said frame means causes a force to be applied to the other of said wheel support means in said first direction and a second bar having first and second torsion parts connected by reversing means and opposed ends of said first and second torsion parts attached to respective ones of said first and second wheel support means such that movement of one of said wheel support means with respect to said frame means in said first direction causes a force to be applied to the other of said wheel support means in a direction opposite to said first direction and wherein said reversing means comprises a first arm attached to said first torsion part and extending away from said first torsion part, a second arm attached to said second torsion part and extending parallel to said first arm and having a length equal to that of said first arm, a rod extending between and pivotally connected to ends of said first and second arms remote from said second bar for applying torsion in said first torsion part to said second torsion part, and pivot support means having a first end attached to said rod intermediate said first and second arms and a second end for attachment to a portion of said frame remote from said second bar for providing a pivot for an intermediate part of said rod and allowing torsion in said first torsion part to be applied to said second torsion part by said rod.

16. A suspension system according to claim 15 wherein said first bar is secured to said frame for rotation with respect to said frame and further comprising a first connector attached to one end of said first bar and to said first wheel support means and extending in a second direction and a second connector attached to an opposed end of said first bar and to said second wheel support means and extending in said second direction.

17. A compound torsion system for an automobile comprising a first bar having opposed ends adapted to be attached to respective ones of first and second wheel support means such that movement of one of said wheel support means in a first direction with respect to a frame means causes a force to be applied to the other of said wheel support means in said first direction and a second bar comprising first and second torsion parts connected by reversing means and having opposed ends adapted to be attached to respective ones of said first and second wheel support means such that movement of one of said wheel support means with respect to said frame means in said first direction causes a force to be applied to the other of said wheel support means in a direction opposite to said first direction and wherein said reversing means comprises a first arm attached to said first torsion part and extending away from said first torsion part, a second arm attached to said second torsion part and extending parallel to said first arm and having a length equal to that of said first arm, a rod extending between and pivotally connected to ends of said first and second arms remote from said second bar for applying torsion in said first torsion part to said second torsion part, and pivot support means having a first end attached to said rod intermediate said first and second arms and a second end attached to said frame remote from said second bar for providing a pivot for an intermediate part of said rod and allowing torsion in said first torsion part to be applied to said second torsion part by said rod.

18. A torsion system comprising a bar having first and second torsion parts connected by reversing means and opposed ends having means for attachment to respective ones of first and second wheel support means such that movement of one of said wheel support means with respect to a frame in a first direction causes a force to be applied to the other of said wheel support means in a direction opposite to said first direction and wherein said reversing means comprises a first arm rigidly attached to said first torsion part and extending away from said first torsion part, a second arm rigidly attached to said second torsion part and extending parallel to said first arm and having a length equal to that of said first arm, a rod extending between and pivotally connected to ends of said first and second arms remote from said bar for applying torsion in said first torsion part to said second torsion part, and pivot support means having a first end attached to said rod intermediate said first and second arms and a second end for attachment to a portion of said frame remote from said bar for providing a pivot for an intermediate part of said rod for allowing torsion in said first torsion part to be applied to said second torsion part.

* * * * *